United States Patent
Yang et al.

(10) Patent No.: US 11,151,890 B2
(45) Date of Patent: Oct. 19, 2021

(54) 5TH-GENERATION (5G) INTERACTIVE DISTANCE DEDICATED TEACHING SYSTEM BASED ON HOLOGRAPHIC TERMINAL AND METHOD FOR OPERATING SAME

(71) Applicant: Central China Normal University, Hubei (CN)

(72) Inventors: Zongkai Yang, Hubei (CN); Zheng Zhong, Hubei (CN); Di Wu, Hubei (CN); Ke Wu, Hubei (CN)

(73) Assignee: Central South Normal University, Wuhan (CN)

( * ) Notice: Subject to any disclaimer, the term of this patent is extended or adjusted under 35 U.S.C. 154(b) by 0 days.

(21) Appl. No.: 17/225,088

(22) Filed: Apr. 7, 2021

(65) Prior Publication Data

US 2021/0225186 A1    Jul. 22, 2021

(30) Foreign Application Priority Data

Dec. 30, 2020    (CN) .......................... 202011604676.3

(51) Int. Cl.
| | | |
|---|---|---|
| *G09B 5/00* | (2006.01) |
| *G09B 5/10* | (2006.01) |
| *G03H 1/00* | (2006.01) |
| *G06F 3/01* | (2006.01) |
| *G06K 9/00* | (2006.01) |
| *G06N 5/02* | (2006.01) |
| *G09B 5/06* | (2006.01) |

(52) U.S. Cl.
CPC ............. *G09B 5/10* (2013.01); *G03H 1/0005* (2013.01); *G06F 3/017* (2013.01); *G06K 9/00255* (2013.01); *G06K 9/00281* (2013.01); *G06N 5/022* (2013.01); *G09B 5/06* (2013.01); *G03H 2001/0088* (2013.01)

(58) Field of Classification Search
CPC .......... G09B 5/10; G09B 5/06; G03H 1/0005; G03H 2001/0088; G06F 3/017; G06K 9/00255; G06K 9/00281; G06N 5/022
See application file for complete search history.

(56) References Cited

U.S. PATENT DOCUMENTS

| | | | |
|---|---|---|---|
| 5,495,576 A | 2/1996 | Ritchey | |
| 2018/0122254 A1* | 5/2018 | Rangan | ................. H04N 7/142 |
| 2020/0026238 A1* | 1/2020 | Chatterjee | ................ G03H 1/26 |
| 2021/0272467   * | 9/2021 | Yang | ...................... G09B 5/067 |

FOREIGN PATENT DOCUMENTS

| | | | | |
|---|---|---|---|---|
| CN | 107680165 A | | 2/2018 | |
| CN | 109035915 A | | 12/2018 | |
| CN | 110478892 A | | 11/2019 | |
| CN | 210091423 U | * | 2/2020 | |
| JP | 2003202799 A | * | 7/2003 | |
| KR | 102217783 B1 | * | 2/2021 | |
| WO | WO-2018044230 A8 | * | 4/2018 | ............... G09B 7/00 |

* cited by examiner

*Primary Examiner* — Khai M Nguyen

(57) ABSTRACT

Provided is a 5G interactive distance dedicated teaching system based on holographic terminal and a working method thereof. The distance dedicated teaching system includes a data acquisition module, a data transmission module, a 5G cloud rendering module, a natural interaction module, a holographic display module and a teaching service module.

4 Claims, 7 Drawing Sheets

5TH-GENERATION (5G) INTERACTIVE DISTANCE DEDICATED TEACHING SYSTEM BASED ON HOLOGRAPHIC TERMINAL AND METHOD FOR OPERATING SAME

CROSS-REFERENCE TO RELATED APPLICATIONS

This application claims the benefit of priority from Chinese Patent Application No. 202011604676.3, filed on Dec. 30, 2020. The content of the aforementioned application, including any intervening amendments thereto, is incorporated herein by reference in its entirety.

TECHNICAL FIELD

This application relates to information technology-based teaching, and more particularly to a 5G interactive distance dedicated teaching system based on holographic terminal and a method of operating the same.

BACKGROUND

Dedicated class means that a full-time teacher from a central school in cities or towns with relatively rich educational resources is assigned o carry out remote online teaching for students through an advanced distance education media, which enables all students in the district to enjoy high-quality education resources. The existing distance dedicated teaching systems are mainly derived from the live online teaching, which is greatly limited by the poor information technology conditions, unrealistic teaching situation and insufficient interaction. Specifically, slow internet speed and stuttering are restrictive to the online teaching, and moreover, it is difficult to carry out high-level online teaching in some schools. Currently, due to effect of network bandwidth and rendering capabilities, a large number of rendering operations are performed at the user terminal in the existing virtual reality technologies, resources, terminals and applications, which renders it difficult to build the large-scale situational teaching environment. In addition, it fails to enable the multi-modal, real-time and diversified interaction between teachers and students, and thus cannot meet innovation needs of an information-based teaching mode. These defects greatly limit the application of the existing distance dedicated teaching systems in the actual teaching scenarios.

SUMMARY

An object of this disclosure is to provide a 5G interactive distance dedicated teaching system based on holographic terminal and a method of operating the same to overcome the defects in the prior art, which provides a new holographic presentation mode and an interaction form for the dedicated class.

Technical solutions of this disclosure are described as follows.

In a first aspect, this application provides a 5G interactive distance dedicated teaching system based on holographic terminal, comprising:
a data acquisition module;
a data transmission module;
a 5G cloud rendering module;
a natural interaction module;
a holographic display module; and
a teaching service module;
wherein the data acquisition module is configured to collect teaching behaviors data of a teaching-listening process and a teacher-student interaction process in a lecturing classroom and a listening classroom;
the data transmission module is configured to enable transmission of audio and video streams and holographic image data between the lecturing classroom and a 5G cloud rendering engine and a holographic terminal of the listening classroom;
the 5G cloud rendering module is configured to perform rendering of teaching video streams and holographic images of a classroom terminal at a high speed; and the classroom terminal comprises the lecturing classroom and the listening classroom;
the natural interaction module is configured to realize interactions between a lecturer and holographic teaching resources and teaching environment in a teaching process by perceiving various interaction behaviors of the lecturer;
the holographic display module is configured to provide a display platform for the holographic teaching resources and a natural interaction; and
the teaching service module is configured to provide teaching resources, analysis of teaching behaviors and process and teaching service management for users.

In a second aspect, this disclosure provides a method of operating the 5G interactive distance dedicated teaching system based on holographic terminal, comprising:

(1) collecting diversified teaching behaviors and a holographic image of a lecturer in a lecturing classroom in real time with the help of a recording device, a motion sensor, an expression sensor, a head sensor and a sight sensor;

(2) transmitting data collected from classroom terminals to a cloud server and a rendering cluster through a 5G network link by control, access and forwarding technologies;

(3) transmitting the rendered holographic image to a holographic display terminal of the classroom terminals after the holographic images are rendered through cloud-based decoding, situation matching, graphics processing unit (GPU) real-time rendering and cloud-based encoding; wherein the cloud-based decoding and the cloud-based encoding are a pair of opposite processes.

(4) collecting relevant information of a holographic environment of the lecturing classroom; analyzing and sorting out the relevant information in terms of motions, emotions and behaviors; and presetting spatial positioning points in the lecturing classroom and connecting rich media teaching resources; registering the rich media teaching resources with the spatial positioning points in the lecturing classroom to allow the lecturer to actively identify and trigger the spatial positioning points and realize the interaction of teachers and students with environment and teaching resources;

(5) according to teaching needs, creating interactive and personalized virtual teaching scenes, and outputting the virtual teaching scenes as holographic resources using a Unity engine and a holographic rendering development kit; building a virtual-reality integrated holographic imaging environment in the classroom terminal; and guiding the lecturer to pay attention to and trigger the spatial positioning points in teaching environment to achieve multi-modal interactions; and (6) publishing a teaching resource application; wherein the teaching resource application comprises publishing and push of the teaching resources and update of the spatial positioning points; and analyzing a teaching style of the lecturer and a degree of focus of the students in the listening classroom by counting the teaching situations of teachers and students before, during and after class to obtain evaluation data of teaching emotions, behaviors and effects, thereby realizing the unified management of the whole teaching service module.

This disclosure has the following beneficial effects.

This application builds a 5G interactive distance dedicated teaching system based on holographic terminal.

Diversified teaching behaviors and a holographic image of a lecturer in a lecturing classroom are collected in real time with the help of a recording device, a motion sensor, an expression sensor, a head sensor and a sight sensor. Data collected from classroom terminals are transmitted to a cloud server and a rendering cluster through a 5G network link by control, access and forwarding technologies. The rendered holographic image is transmitted to a holographic display terminal of the classroom terminals after the holographic images are rendered through cloud-based decoding, situation matching, GPU real-time rendering and cloud-based encoding. Relevant information of a holographic environment of the lecturing classroom is collected, analyzed and sorted out in terms of motions, emotions and behaviors. Spatial positioning points are preset in the lecturing classroom and rich media teaching resources are connected. The rich media teaching resources are registered with the spatial positioning points in the lecturing classroom to allow the lecturer to actively identify and trigger the spatial positioning points and realize the interaction of teachers and students with environment and teaching resources. According to teaching needs, interactive and personalized virtual teaching scenes are created, and the virtual teaching scenes are outputted as holographic resources using a Unity engine and a holographic rendering development kit. A virtual-reality integrated holographic imaging environment is built in the classroom terminal. The lecturer is guided to pay attention to and trigger the spatial positioning points in teaching environment to achieve multimodal interactions. A teaching service module supports publishing and push of the teaching resources and update of the spatial positioning points. A teaching style of the lecturer and a degree of focus of the students in the listening classroom are analyzed by counting the teaching situations of teachers and students before, during and after class to obtain evaluation data of teaching emotions, behaviors and effects. The development of 5G network and a holographic display technology makes applications in classroom teaching more and more mature. This application is helpful to meet needs of the distance dedicated teaching.

DETAILED DESCRIPTION OF EMBODIMENTS

The present disclosure will be further described in detail with reference to the embodiments and the accompanying drawings, from which objects, technical solutions and advantages of the present disclosure will be better understood. It should be understood that the embodiments presented in the accompanying drawings are merely illustrative of the disclosure, and are not intended to limit the present disclosure. In addition, described below are technical features in various embodiments, which can be combined with each other as long as they do not contradict each other.

Figure 1:
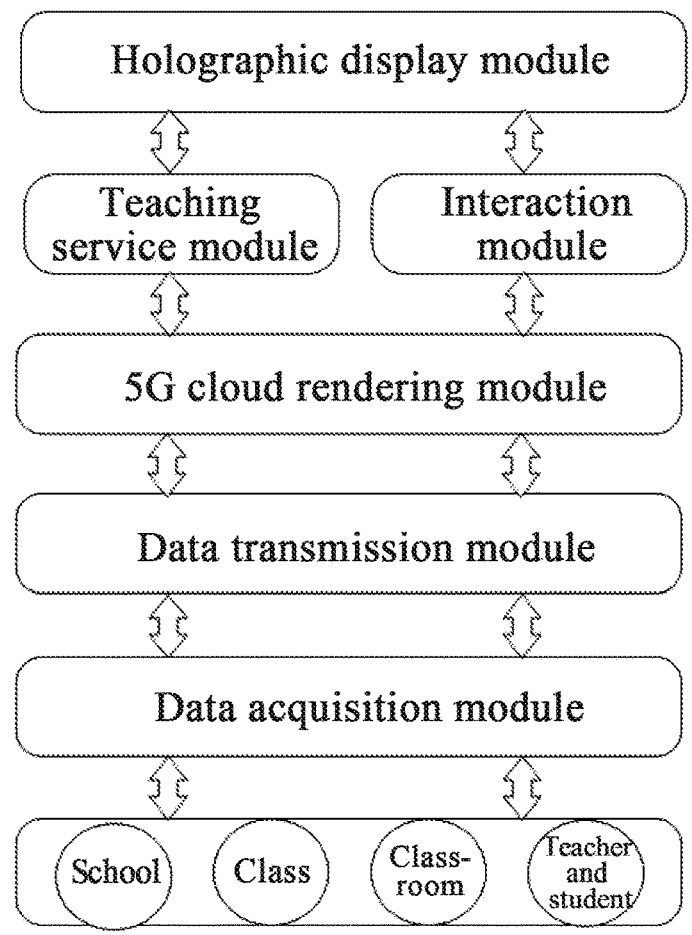
FIG. 1 is an architecture diagram of a 5G interactive distance dedicated teaching system based on holographic terminal according to an embodiment of the present disclosure.

As shown in FIG. 1, illustrated is a 5G interactive distance dedicated teaching system based on holographic terminal, including a data acquisition module, a data transmission module, a 5G cloud rendering module, a natural interaction module, a holographic display module and a teaching service module.

The data acquisition module is configured to collect teaching behaviors data of a teaching-listening process and a teacher-student interaction process in a lecturing classroom and a listening classroom.

The data transmission module is configured to enable transmission of audio and video streams and holographic image data between the lecturing classroom and a 5G cloud rendering engine and a holographic terminal of the listening classroom.

The 5G cloud rendering module is configured to perform rendering of teaching video streams and holographic images of a classroom terminal at a high speed. The classroom terminal comprises the lecturing classroom and the listening classroom.

The natural interaction module is configured to realize interactions between a lecturer and holographic teaching resources and teaching environment in a teaching process by perceiving various interaction behaviors of the lecturer.

The holographic display module is configured to provide a display platform for the holographic teaching resources and a natural interaction.

The teaching service module is configured to provide teaching resources, analysis of teaching behaviors and process and teaching service management for users.

The application further provides a working of operating the 5G interactive distance dedicated teaching system based on holographic terminal.

(1) Data Acquisition

Figure 2:
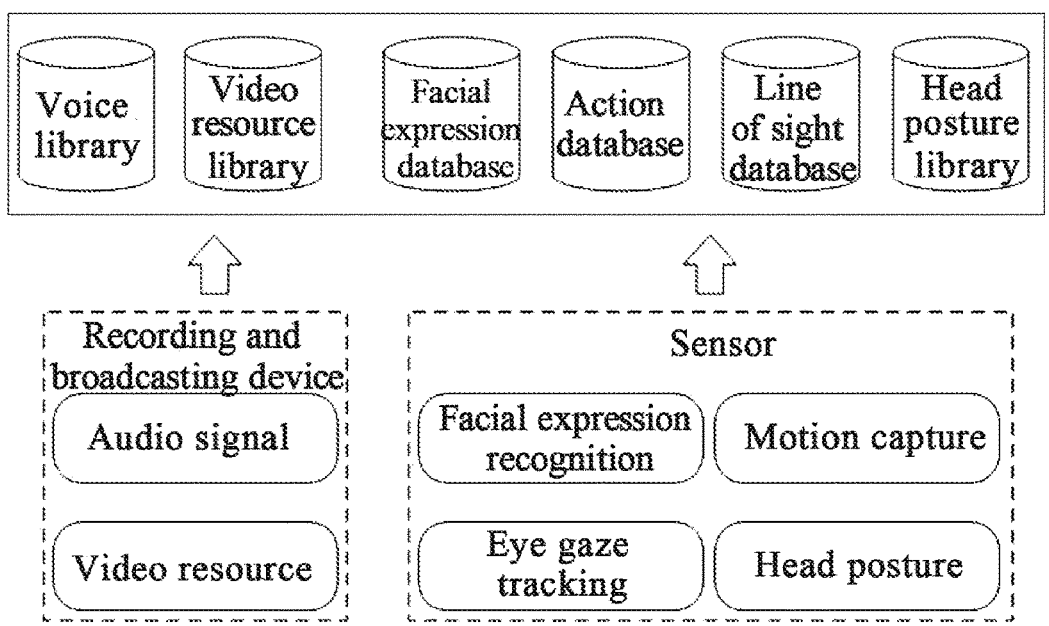
FIG. 2 is a work flow chart of a data acquisition module according to an embodiment of the present disclosure.

Referring to a flow chart of data acquisition shown in FIG. 2, data of videos, voice, gesture, body movement, facial expressions, rotations of head and focus of sight lines of a in a lecturer in a lecturing classroom and a holographic interaction image are collected in real time with the help of a recording device, a motion sensor, an expression sensor, a head sensor and a sight sensor according to diversified teaching behaviors of the lecturer in teaching-listening and teacher-student interaction activities in the lecturing classroom. The data acquisition is performed through the following steps.

(1-1) Voice and Video Data Acquisition

Video and audio signals of the lecturing classroom recorded by the recording device are integrated into a synchronous recording form through a multi-stream recording mode. Voice data are stored in a pulse code modulation (PCM) format according to a G.728 audio protocol. HDMI video source codes are compressed into a standardized stream media content with a 4K resolution according to a HEVA video protocol. An on-demand list is generated in an MP4 format in a teaching service module.

(1-2) Gesture Data Acquisition

Depth images of the teacher are collected using a depth sensing device to obtain skeleton data of the lecturer. 25 key skeletal regions of the teacher are tracked using an inertia-based motion capture device to collect high-density, multi-angle, and typical feature information. Movements of the lecturer are recorded in a Biovision Hierarchy (BVH) format. The movements of the lecturer are uploaded to a cloud rendering engine to assist interactions between subsequent data perception and holographic environment.

(1-3) Tracking of Head and Sight Data

A target tracking system is constructed in the lecturing classroom using a camera and a desktop telemetry eye tracker. Head spatial postures of the lecturer are obtained in real time using a head posture estimation technology. The head spatial postures of the lecturer and a coordinate system of eye tracking are subjected to integration and transformation. A blink recovery time and a gaze recovery time are set. A duration that a gaze point of the teacher is maintained is recorded to quantify visual attention of the teacher to areas of interest. Key parameters of head and sight of the lecturer are described in an evs format.

I. A head coordinate system is established with the camera as an origin. Quaternion of head rotation of the lecturer is captured by the camera to build a movement direction model.

II. A sight range of the lecturer is determined in comprehensive with Euler angles of head posture of the lecturer.

III. Three-dimensional (3D) attitude angles of the head of the lecturer are captured in real time. The three-dimensional attitude angles and the coordinates detected by the eye tracker are synthesized and transformed, so as to realize the gaze target tracking of the head and eyes of the lecturer.

(1-4) Expression Data Acquisition

A gradient boosting decision tree (GBDT) is built using a regression-based face alignment algorithm. The GBDT is expressed as $\hat{S}^{(t+1)}=\hat{S}^{(t)}+r_t(I,\hat{S}^{(t)})$ and can estimate positions of facial key points, where $\hat{S}(t)$ is a shape of a $t^{th}$ regressor, t represents a cascaded series, I is an image and $r_t$ represents a regressor of a current level.

A face area detection technology is configured to filter irrelevant background and a depth camera device is configured to collect face area of the lecturer.

A search and matching strategy of "rough to fine" is applied in the face area of the lecturer to detect key points of the lecturer's face and extract 3D coordinates of the key points, such as eyes, eyebrows and mouth. An active appearance model (AAM) method and a constrained local model (CLM) method is adopted to fuse a human body model and a local texture model and extract multi-pose facial key points for the lecturer.

On the basis of ASM, the AAM further performs statistical modeling of texture and fuses two statistical models of shape and texture into an appearance model. The texture is a shape-independent image obtained by transforming a face image to an average shape. The CLM allows the key points of each average face to search and match in its neighborhood, so as to complete a detection of the key points by initialization position of the average face.

The camera is configured to capture an outline of facial organs of the lecturer and dynamically collect expression information of the lecturer and complete real-time tracking of different facial expressions of the lecturer.

(1-5) Holographic Image Acquisition

Multi-angle and multi-camera scanning is performed on the lecturing classroom through a wide-angle acquisition technology to fuse teaching video images of the lecturer in real-time. A position of the lecturer is adjusted in time according to direction and intensity of a light source in the lecturing classroom to maintain a balanced binocular parallax of the lecturer. A teaching process is dynamically collected and tracked.

(2) Data Transmission

Figure 3:
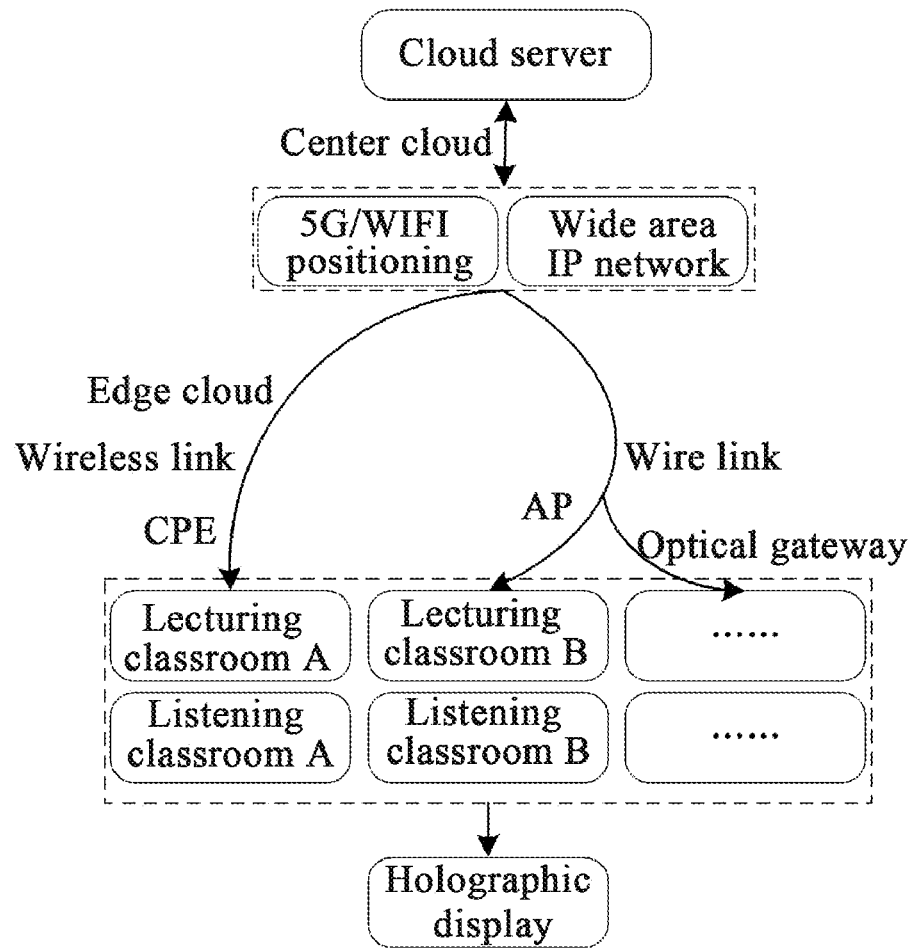
FIG. 3 is a work flow chart of a data transmission module according to an embodiment of the present disclosure.

As shown in FIG. 3, data and cloud rendering contents collected from classroom terminals are transmitted to a cloud server and a rendering cluster through a 5G/wireless-fidelity (WIFI)/positioning module and wide-area internet protocol (IP) network links, such as a wireless router and 5G, by control, access and forwarding technologies. Functions of 5G network access, transmission path, multi-conditional resource deployment and cloud network forwarding are optimized to ensure flexibility and efficiency of the use of the interactive and remote dedicated classrooms.

(2-1) 5G Network Access in Classroom Terminals

The lecturing classroom and the listening classroom are connected to 5G network using wireless and wired modes. In the wireless mode, 5G signals are converted into WIFI signals by a centralized cloud-radio access network (C-RAN). In the wired mode, the 5G signals are converted into the WIFI signals through an access point (AP) using a customer premise equipment (CPE) as an optical transport network (OTN) dedicated line device. Optical signals are connected through optical fiber gateways and an optical splitter device. Sharing of information resources can be achieved such as data transmission and reception and channel quality at each classroom end and strengthen the cooperative relationship.

The C-RAN is a clean system based on centralized processing, collaborative radio and real-time cloud infrastructure. The CPE is a mobile signal access device, which receives mobile signals and forwards them with wireless WIFI signals. The CPE is also a device that converts high-speed 4G or 5G signals into WIFI signals and can support more mobile terminals to surf the Internet at the same time. The OTN refers to a transmission network that realizes transmission, multiplexing, routing, and monitoring of service signals in the optical domain and guarantees its performance indicators and survivability.

(2-2) 5G Positioning

Figure 4:
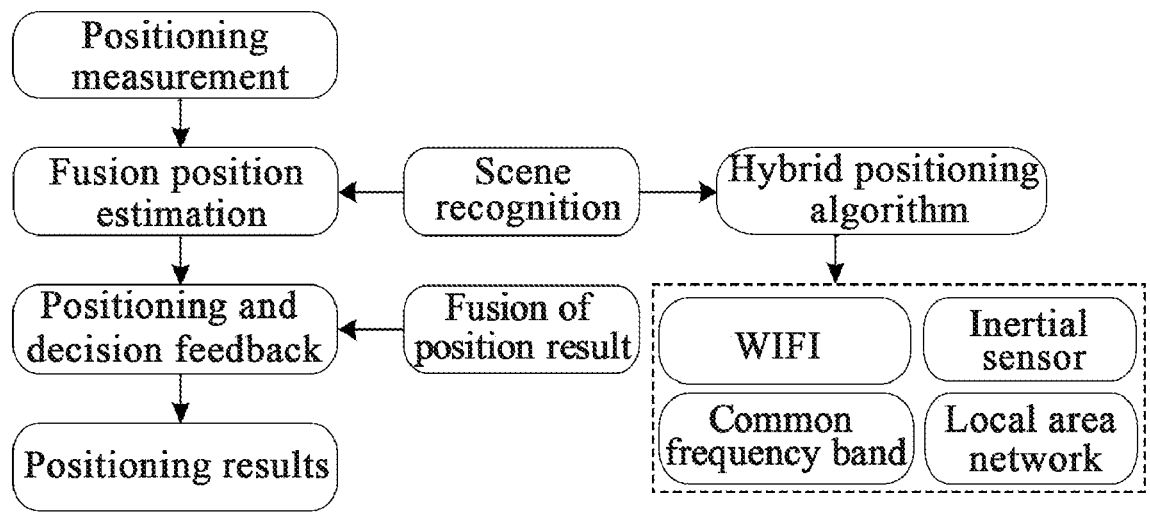
FIG. 4 is a work flow chart of a 5G positioning according to an embodiment of the present disclosure.

As shown in FIG. 4, a position of a receiving end of a transmission response target is predicted through positioning measurement technologies of WIFI, common frequency band, local area network and an inertial sensor using a high frequency or millimeter-wave communication method and a position estimation-fused hybrid positioning algorithm. In addition, abnormal positioning is reduced to improve reliability and stability of positioning and output the best positioning results and decision-making responses.

(2-3) Data Transmission Link

Cloud, terminal, 5G core network and base station are collected based on combination of central cloud and edge calculation to perform real-time collection and transmission of 4K ultra-high-definition videos and holographic image contents. Multi-access edge computing (MEC) has capabilities of connection, computing and storage, which is able to deploy business sink to the edge of the network and partake more core network traffic and computing abilities. After transmission signals are received by the base station, the transmission signals are directly processed in a MEC server. According to the rules, transmission situations are adjusted in real time and the data transmission and signal treatment process are optimized.

(3) 5G Cloud Rendering

Figure 5:
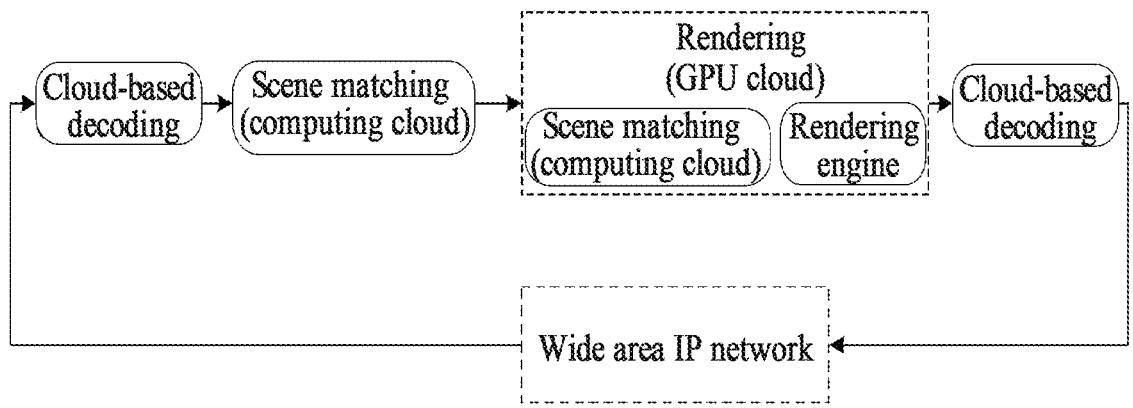
FIG. 5 is a work flow chart of a 5G cloud rendering module according to an embodiment of the present disclosure.

As shown in FIG. 5, audio and video streams and holographic image data of the lecturing classroom and the listening classroom are transmitted to the 5G cloud rendering module through a 5G link for rendering. The rendered holographic images are transmitted to a holographic display terminal of the classroom terminals through cloud-based decoding, situation matching, graphics processing unit (GPU) real-time rendering and cloud-based encoding, where the cloud-based decoding and the cloud-based encoding are a pair of opposite processes.

(3-1) Cloud-Based Decoding

The 5G cloud rendering module receives the audio and video streams and the holographic image transmitted through the 5G network followed by combining other collected interaction data to complete decoding operation. The cloud-based decoding is performed through main steps of entropy decoding, prediction, inverse quantization, inverse transformation and loop filter.

I. During a process of the entropy decoding, a decoder obtains a compressed bitstream.

II. Data elements are entropy decoded and reordered to generate a series of quantized coefficients X.

III. Dn' is generated after the inverse quantization and the inverse transformation and is consistent with Dn' on an encoding end.

IV. The decoder generates a predicted macroblock P through header information decoded from the bitstream, which is consistent with a previous predicted macroblock P' generated in the encoder.

(3-2) Situation Matching

The holographic image that needs to be presented in a next frame is determined from a perspective of the lecturer through combination of teaching situations and interactions between the lecturer and resources. A position, a posture and a scale ratio of a corresponding model in a teaching scene are updated according to teaching situations and interactive operations, so as to determine contents of the next rendered frame.

(3-3) GPU Cloud Rendering

Contents of each frame are rendered by the 5G cloud rendering engine using a GPU computing power to generate a new holographic image and sound, where the 5G cloud rendering engine has functions of rendering scheduling, GPU computing power and rendering engine to enable the rendering of the uploaded audio and video streams and the holographic image of the classroom terminals. The cloud rendering is performed through the following steps.

I. The 5G cloud rendering engine creates multiple threads and executes them in parallel. A rendering completion flag A and a video block encapsulation completion flag B are set on a main thread, where A=false and B=false. The rendering information is determined according to the width and height of the received video image. At the same time, a sending thread and an interactive thread are opened, and the following steps are executed in parallel.

II. A is configured to determine whether to start rendering. If A is false, 3D scene rendering is performed. A is set to true after finish rendering. A and B are configured to determine whether to compress. If A is true and B is false, the rendered image is compressed into frames of H265 video stream and put in the MP4 video container Buffer. A is set to false. Step III is executed in a loop until the rendering thread ends.

III. The sending thread determines whether the number of compressed frames contained in the current H265 video block reaches ⅙ of that of FPS. If so, B is set to true and files are added to the tail of the MP4 video container buffer and relevant information of header files is adjusted. At the same time, the parameters of the MP4 video container and compression encoder are initialized, and B is set to false. Step IV is executed in a loop until the sending thread ends.

IV. If interactive data is received in the interactive thread and A is true, the received interactive data is transmitted to the 5G rendering engine.

(3-4) Cloud-Based Encoding

The audio and video streams and the holographic image generated by the 5G cloud rendering module are programmed by H265 video coding with high compression rate and strong robustness. A form of B-frame coding is adopted in order to keep an inter-frame space stable. The cloud-based encoding is performed through main steps of prediction, transformation, quantization, entropy coding and loop filter.

(3-5) Asynchronous Rendering of Cloud and Terminal

In order to a smooth user experience, an asynchronous rendering technology is adopted to ensure that a media transfer protocol (MTP) between the 5G cloud rendering module and the holographic display module is less than or equal to 20 ms, thereby enabling a gap between the holographic image on the classroom terminal and the holographic image being rendered by the 5G cloud rendering engine to be not more than 2 frames to ensure visual synchronization between the lecturing classroom and the listening classroom.

The MTP is a custom extension protocol based on picture transfer protocol, which allows users to linearly access media files on mobile devices.

(3-6) Load Balancing Algorithm

In the rendering process of holographic images, a load balancing algorithm based on dynamic prediction of a recursion depth is adopted to ensure that each GPU bears a load corresponding to the rendering and drawing performance and ensure the same drawing time and a relatively stable rendering system.

(4) Natural Interaction

Relevant information of the holographic environment of the lecturing classroom is collected. Characteristics of the lecturer are analyzed and sorted out in terms of motions, emotions and behaviors. According to teaching requirements, spatial positioning points are preset in the lecturing classroom and rich media teaching resources are connected. The rich media teaching resources are registered with the spatial positioning points in the lecturing classroom to allow the lecturer to actively identify and trigger the spatial positioning points. According to an input type of the interaction, various operation commands for interaction with the holographic image are generated to realize the interaction of teachers and students with environment and the teaching resources.

The rich media is not a specific form of Internet media, which refers to a method of information dissemination with animation, sound, video or interactivity. The rich media includes one or a combination of streaming media, sound, Flash, Java, Javascript, and DHTML.

(4-1) Perceptual Submodule

Virtual objects, virtual scenes and related information of the lecturer in the holographic imaging environment of the lecturing classroom are collected. The characteristics of the lecturer are analyzed and sorted out in terms of motions, emotions and behaviors under the support of a teaching strategy database, a behavior rule database and a domain knowledge database.

(4-1-1) Information Collection

Figure 6:
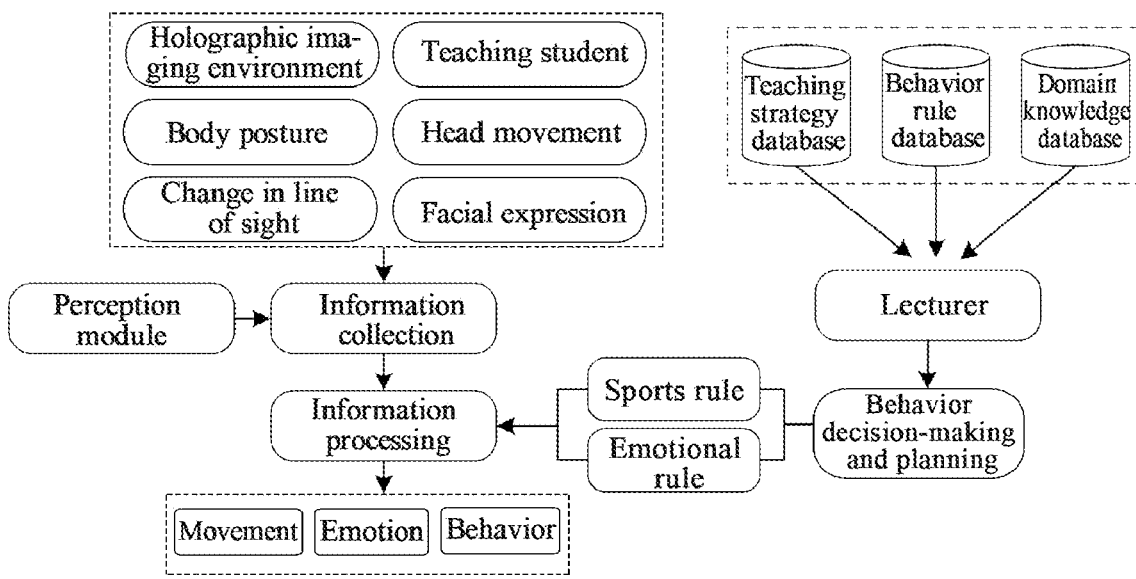
FIG. 6 is a work flow chart of a perceptual submodule according to an embodiment of the present disclosure.

As shown in FIG. 6, the relevant information of the lecturing classroom is collected, where the relevant information of the lecturing classroom comprises addition, deletion, modification and reorganization of teaching objects in the holographic imaging environment, a jump and a jump sequence of the virtual scene and postures, facial expressions, head movements and sight changes and behavior changes of the lecturer (4-1-2) Information Processing According to teaching objectives, styles and characteristics, the characteristics of the lecturer are analyzed and sorted out with the support of the teaching strategy database, the behavior rule database and the domain knowledge database. Characteristic data of different levels of reaction type, compound type and intelligent type are classified according to the motions, emotions and behaviors.

(4-2) Registration Submodule

Figure 7:
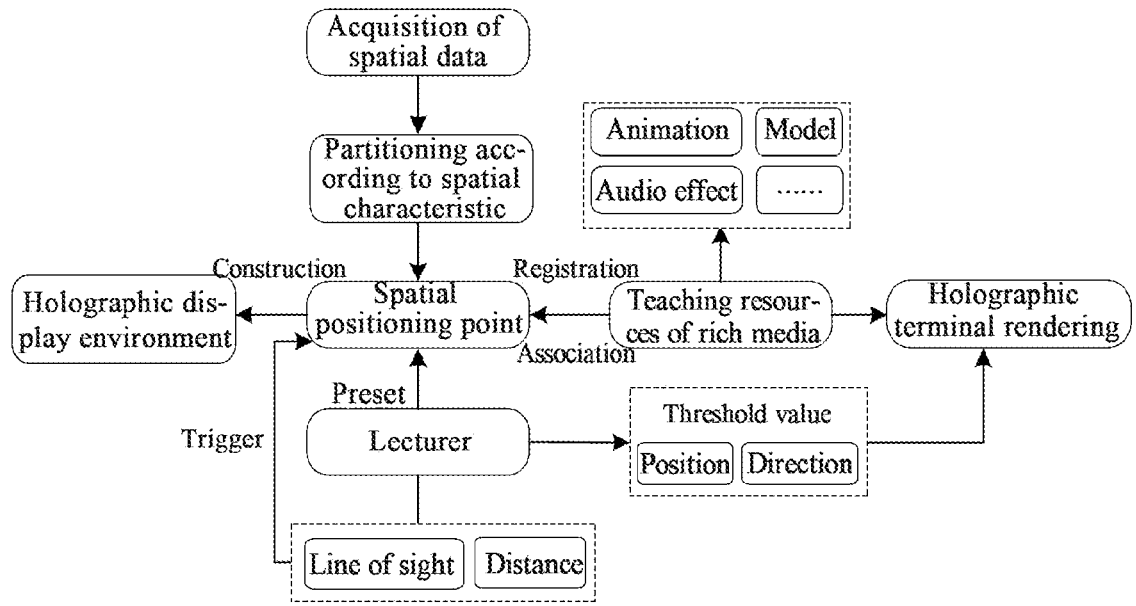
FIG. 7 is a work flow chart of a registration submodule according to an embodiment of the present disclosure.

As shown in FIG. 7, a teaching scene is constructed. According to the teaching requirements, the spatial positioning points are preset in the lecturing classroom and the rich media teaching resources are connected. The rich media teaching resources are registered with the spatial positioning points in the lecturing classroom to allow the teacher to actively identify and trigger the teaching resources associated with the spatial positioning points in the teaching process, thereby enabling the presentation of the holographic image of the teaching resources on the holographic terminal.

(4-2-1) Preset of Spatial Positioning Points

A holographic display environment in the lecturing classroom is constructed. The teaching resources are preset and located by the teacher to a certain position in the lecturing classroom through the spatial positioning points, so as to flexibly invoke the teaching resources, improve the loading speed of the holographic scene and reduce the time and steps to trigger the holographic scene during the teaching process.

(4-2-2) Association with Teaching Resources

According to teaching requirements of a subject, the lecturer creates and edits the rich media teaching resources suitable for display in the holographic imaging environment. Virtual contents are registered in a real environment and setting trigger conditions to complete the association between the teaching resources and the real spatial positioning points. Corresponding storage information is recorded in a JavaScript object notation (JSON) format and the recorded information is uploaded to a cloud.

(4-2-3) Triggering of Spatial Positioning Points

The lecturer triggers the teaching resources associated with the spatial positioning points according to teaching needs during teaching, question-answering and interactive activities in the lecturing classroom. For example, when sight direction of the lecturer meets a trigger threshold within the range of plus or minus 150 and a distance meets the trigger threshold with less than 3 meters, the holographic terminal will display the holographic images of the associated teaching resources.

(4-3) Interactive Output Command

Figure 8:
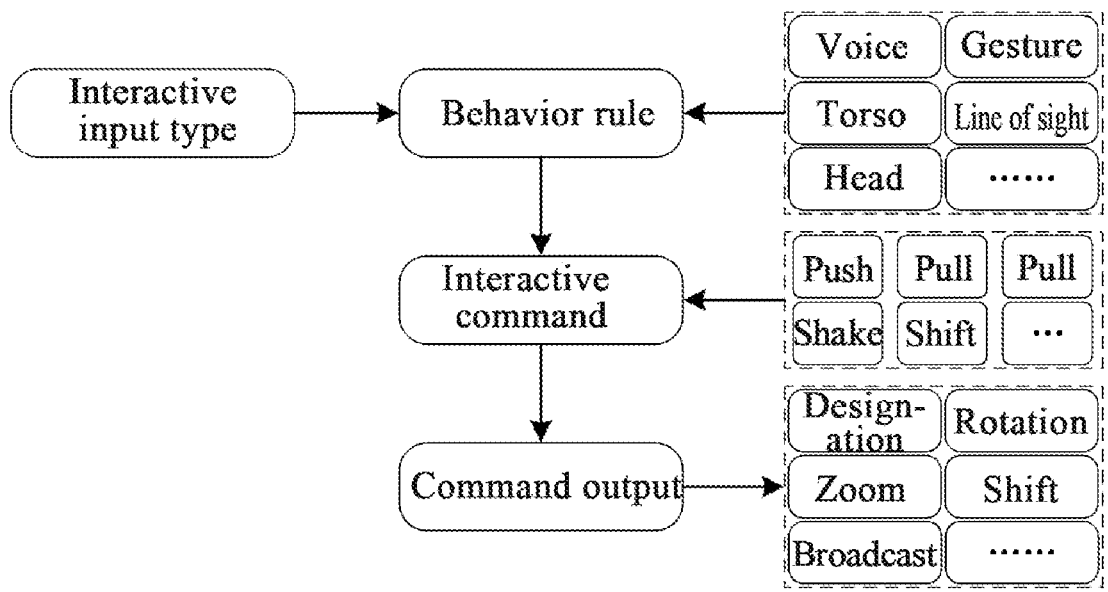
FIG. 8 is a work flow chart of an interactive command output according to an embodiment of the present disclosure.

As shown in FIG. 8, according to the input type of the interaction of the lecturer, behavior rules are invoked to generate various operation commands for interaction with the teaching resources. The lecturer can jump and switch an interface, a scene and a model of a holographic teaching environment to realize the interaction with the environment and the teaching resources.

(4-3-1) Interactive Command

According to the input type of the interaction of the lecturer, execution rules corresponding to input characteristics of voice, gesture, body, sight and head are invoked to generate the operation commands, comprising push, pull, shake, shift and drag for interaction with the holographic teaching resource images associated with the spatial positioning points.

(4-3-2) Command Output

According to interactive commands of gestures and postures, the lecturer can select, rotate, zoom, move, show/hide and play holographic teaching contents associated with the spatial positioning points to perform jumping and switching of the interface the scene and the model of the holographic teaching environment, so as to realize the interaction with the environment and the teaching resources.

(5) Holographic Display Module

Figure 9:
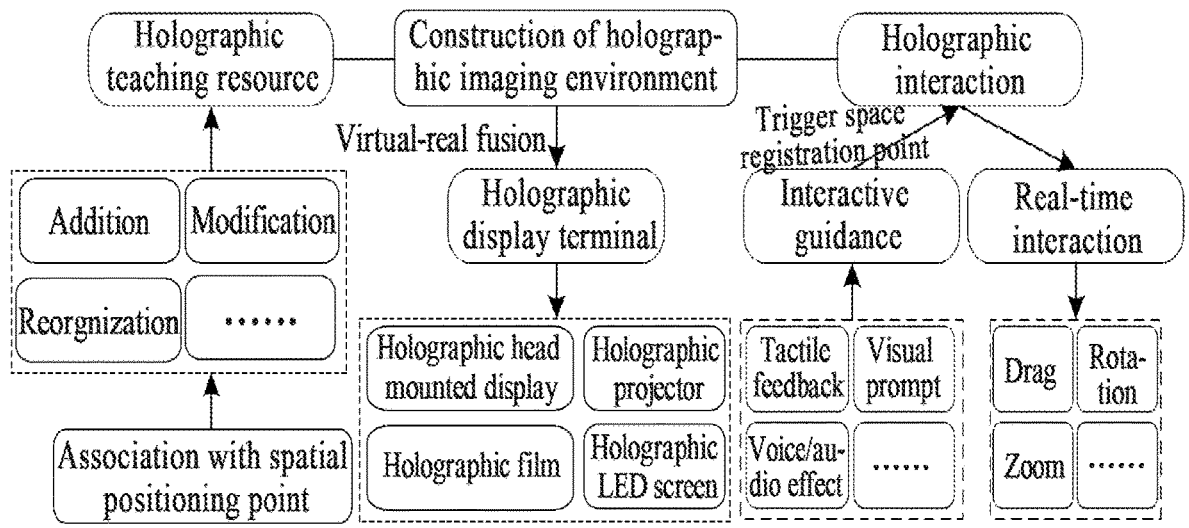
FIG. 9 is a work flow chart of a holographic display module according to an embodiment of the present disclosure.

As shown in FIG. 9, according the teaching needs, interactive and personalized virtual teaching scenes are created, and the virtual teaching scenes are output as holographic resources using a Unity engine and a holographic rendering development kit. A virtual-reality integrated holographic imaging environment is provided different holographic display terminals in the lecturing classroom and the listening classroom. The lecturer is guided to pay attention to and trigger the spatial positioning points in the teaching environment through a visual cue, a tactile feedback, voice or sound effect to achieve multi-modal interactions.

(5-1) Construction of Holographic Teaching Resources

According to the teaching needs, display attributes, audio effects and playing sequence of a 3D model in the teaching scene are modified to complete editing of the personalized and interactive virtual teaching scenes with high fidelity and strong interaction. The virtual teaching scenes are output as the holographic resources using the Unity engine and the holographic rendering development kit (5-1-1) Editing of the Interactive Virtual Teaching Scenes A complete virtual teaching resource library is built to enable the teacher to quickly find and select the required virtual teaching resources. According to the teaching needs, the personalized and interactive virtual teaching scenes are edited by modifying geometry, texture, and material properties of the 3D model in the teaching scene, adding sounds and audio effects, specifying a rendering mode of the virtual scene and setting the playing sequence of the virtual scenes.

(5-1-2) Construction of Holographic Teaching Resources

The virtual teaching scenes with high fidelity and strong interaction are output as the holographic resources using the Unity engine and the holographic rendering development kit to achieve the construction of the holographic teaching resources. The holographic teaching resources are associated with the spatial positioning points to stimulate, invoke and watch the holographic teaching resource images according to the teaching needs.

(5-2) Construction of the Holographic Imaging Environment

A holographic head mounted display with augmented reality function is provided for the lecturer in the lecturing classroom. A holographic projector, a holographic light-emitting diode (LED) screen and a holographic film are provided in the listening classroom. The holographic teaching environment formed through superposition of the virtual teaching resources and a real space of the lecturing classroom is constructed using the holographic display terminal (5-2-1) Holographic Display Terminal A holographic head mounted display with augmented reality function is provided for the lecturer in the lecturing classroom, which can transmit the holographic images rendered by the 5G cloud rendering module to the remote listening classroom through a 5G network. The listening classroom is provided with the holographic projector, the holographic LED screen and the holographic film, which are configured for three-dimensional reproduction of teaching activities in the lecturing classroom through a holographic rendering mode.

(5-2-2) Construction of the Holographic Teaching Environment

The holographic teaching environment formed through superposition of the holographic teaching resources and the real space and an information interaction loop between the teacher, the teaching resources and the real environment are constructed. A first perspective is set to enable the teachers and students in the listening classroom to obtain the same visual experience as the lecturer in the lecturing classroom.

(5-3) Holographic Interaction

The lecturer is guided to pay attention to and trigger the spatial positioning points in the teaching environment through the visual cue, the tactile feedback, the voice or the sound effect. Objects are dragged, rotated, and zoomed in the holographic imaging environment by using gestures, sight, and voice.

(5-3-1) Interactive Guidance

The lecturer is guided to pay attention to and trigger the spatial positioning points in the teaching environment through the visual cue, the tactile feedback, the voice or the sound effect using a holographic imaging system, so as to present videos of the associated holographic teaching resources, where the holographic imaging system is capable of making full use of space environment of the classrooms. The lecturer is allowed to interact with the teaching resources according to the teaching process (5-3-2) Real-Time Interaction A position and movement information of the lecturer in a holographic teaching space are captured through a built-in sensor and a positioning tracker of the holographic head mounted display. The lecturer is allowed to view details of the virtual objects in the teaching resources from multiple perspectives and drag, rotate and zoom the virtual objects in the holographic environment by using the gestures sight and voice.

Figure 10:
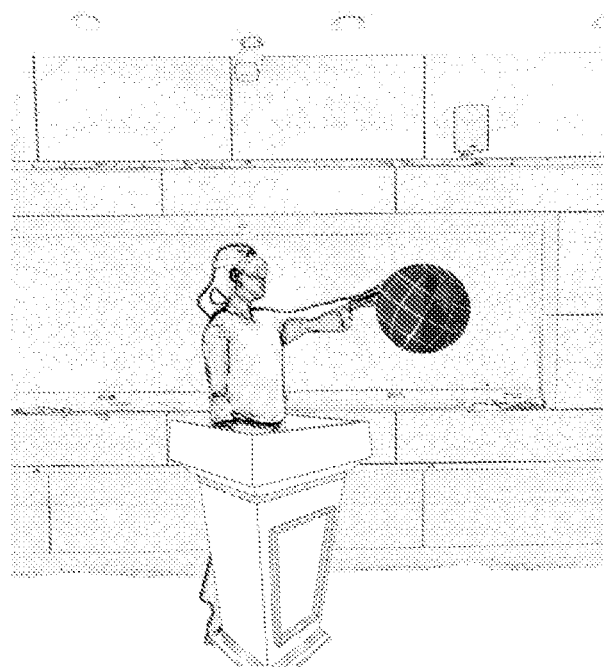
FIG. 10 schematically shows an interaction between teachers and holographic teaching resources according to an embodiment of the present disclosure.

As shown in FIG. 10, the lecturer can project an earth model into the lecturing classroom during teaching geography. The lecturer can zoom in, zoom out and flip the earth model through the gesture operation to view the earth model from different angles.

(6) Teaching Service Module

The teaching service module includes publishing submodule of a teaching resource application, an analysis submodule of teaching behaviors and processes. The publishing of a teaching resource application includes publishing and push of the teaching resources and update of the spatial positioning points.

(6-1) Publishing of the Teaching Resource Application

Figure 11:
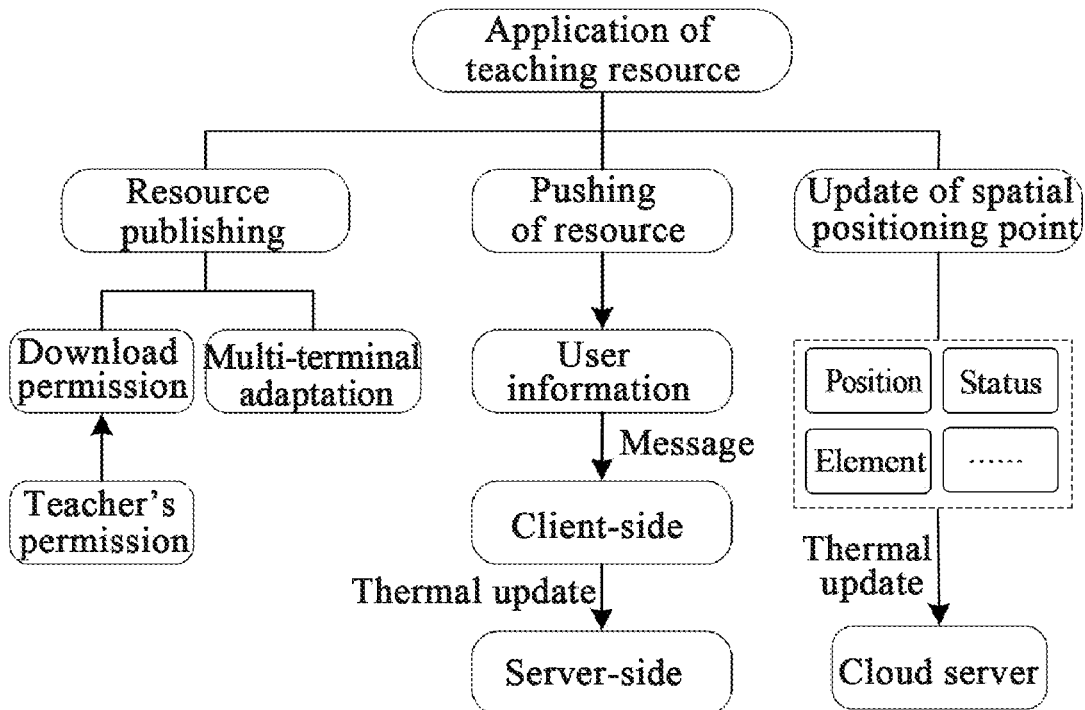
FIG. 11 is a work flow chart of the publishing of resource application in a teaching service module according to an embodiment of the present disclosure.

As shown in FIG. 11, the teaching resources adapted to multiple terminals are published according to configuration information collected in the classroom terminals. An update data package is pushed to a client through a message push and hot update mechanism. Information of the spatial positioning points is recorded and the information of the spatial positioning points is updated to the cloud.

(6-1-1) Publishing of the Teaching Resources

Download permissions for different teaching resources are provided according to a teacher's permissions. Content matching of different resolutions is provided according to an operating system and screen size and resolution of the lecturing classroom terminal and the listening classroom terminal. A multi-terminal adaptation of resources is completed according to absolute coordinates of the spatial positioning points to ensure that the resources at the spatial positioning points do not shift during interaction.

(6-1-2) Push of the Teaching Resource Application

According to the information of the classroom terminal recorded in the background, the teaching service module sends upgrade and update information to the classroom terminal through the message push mechanism. Course contents, teaching resources and virtual scenes updated in the cloud are pushed to the classroom terminal in a form of data packet through the hot update mechanism.

(6-1-3) Synchronous Update of the Spatial Positioning Points

The information of the spatial positioning points set and edited by the lecturer in course resources are recorded in the JSON format, where the information of the spatial positioning points includes ID, three-dimensional positions and elements, statuses, positions, postures and zoom ratios of holographic teaching scenes. The information of the spatial positioning points is synchronously stored to the cloud to meet sharing experience of the same spatial location on different terminals in a dedicated classroom system.

(6-2) Analysis of Teaching Behaviors and Processes

Figure 12:
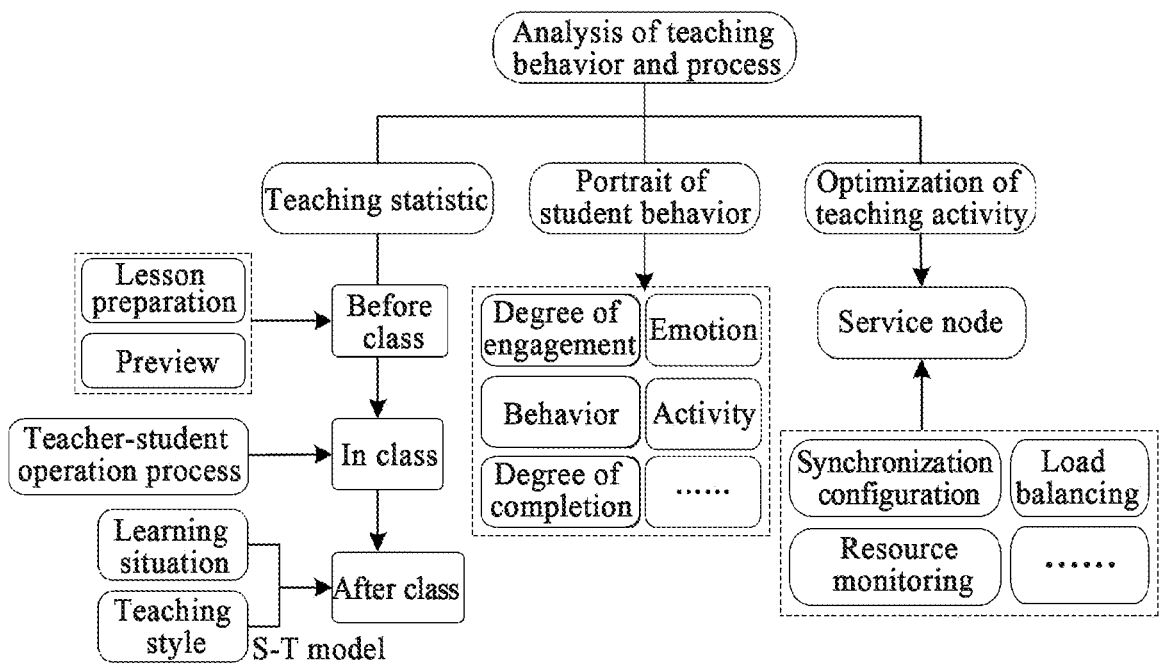
FIG. 12 is a flow chart of analysis of teaching behaviors and processes in the teaching service module according to an embodiment of the present disclosure.

As shown in FIG. 12, a teaching style of the lecturer is analyzed by counting the teaching situations of teachers and students before, during and after class. The degree of focus of the students in the listening classroom is analyzed by counting learning behaviors of the students, comprising head up and down and visual residence time to obtain evaluation data of teaching emotions, behaviors and effects.

(6-2-1) Teaching Statistics

A lesson preparation situation of the teachers and a preview situation of the students are recorded in real time before class according to the remote and holographic teaching environment where teachers and students of the system are located. An operation process of the teachers and students is checked in real time in class. Completion situation of homework and data on the strong and weak points of knowledge mastery are analyzed after class. The teaching style of the lecturer is analyzed based on a Takagi-Sugeno (T-S) model.

Takagi and Sugeno proposed a new fuzzy inference model in 1985 to overcome problems of huge inference rules in multi-dimensional fuzzy inference, which is called T-S model. "IF" part of the fuzzy rule of the T-S model is similar to "IF" part of the zadeh rule. "THEN" part of the fuzzy rule of the T-S model is an exact function, usually a polynomial of an input variable. A linear local equation replaces a constant in a general inference process in a conclusion part of the T-S fuzzy inference model.

(6-2-2) Portraits of Students' Classroom Behavior

The degree of focus of the students in the listening classroom is analyzed by counting learning behaviors of the students, comprising head up and down and visual residence time, to obtain the evaluation data of the teaching emotions, behaviors and effects. An accurate portrait description is performed on each student according to grades and completion progresses of the homework.

(6-2-3) Optimization of Teaching Activity

The teaching activities are monitored and measured to synchronization configuration, load balancing and resource monitoring of service nodes are completed, so as to ensure that the teaching activities of the lecturing classroom can be smoothly synchronized to each listening classroom. According to the IP address of each classroom end, status of each node can be monitored and judged, and the optimal node can be intelligently selected to provide high-quality resources and services.

(6-3) Teaching Service Management

Figure 13:
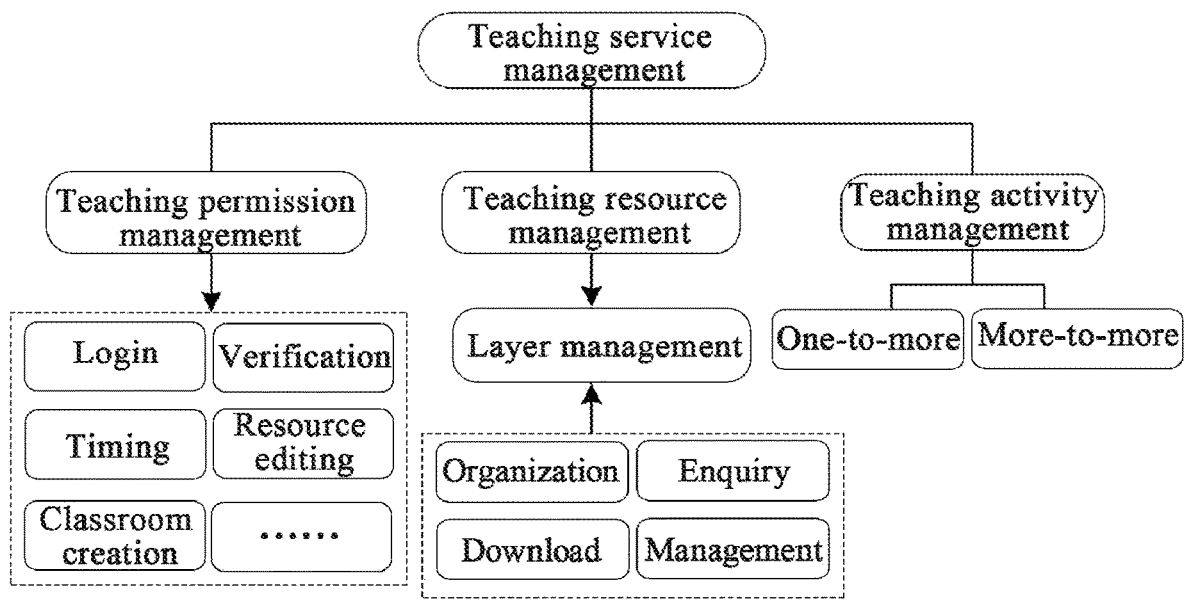
FIG. 13 is a work flow chart of a teaching service management in the teaching service module according to an embodiment of the present disclosure.

The teaching service system is managed. As show in FIG. 13, the management of the teaching service system includes management of teacher permissions, teaching resource and teaching activities, system setting, system maintenance, parameter settings and data backup and recovery to ensure safety and integrity and consistency of the data.

(6-3-1) Teacher Permission Management

Login, verification, timing, resource editing, and classroom creation functions are provided for the teachers when using the teaching service module to assist the teachers to log in to the teaching service module, pass identity verification, record use time and retrieve virtual teaching resources based on permissions and create or log in to dedicated classrooms.

(6-3-2) Teaching Resource Management

The virtual teaching resources and recorded teaching resources thereof are managed using a catalog-style scene tree according to a level of section>discipline>unit>knowledge point where each node corresponds to a teaching resource. The node can clearly reflect location and hierarchical relationship of the teaching resource, and a clear structure is convenient for teachers to organize, query, download and manage.

(6-3-3) Teaching Activity Management

Flexibly various forms of teaching activities are performed in the dedicated classroom system, where the dedicated classroom system supports the synchronous online teaching between one lecturing classroom and multiple listening classrooms, or supports the synchronous online teaching between multiple lecturing classrooms and multiple listening classrooms.

What is claimed is:

1. A $5^{th}$-generation (5G) interactive distance dedicated teaching system based on holographic terminal, comprising:
   a recording device;
   a network link;
   a graphics processing unit GPU;
   a holographic terminal;
   a holographic displayer; and
   a cloud server;
   wherein the recording device is configured to collect teaching behavior data of a teaching-listening process and a teacher-student interaction process in a lecturing classroom and a listening classroom, wherein the collecting further comprises subjecting head spatial postures of a teacher and a coordinate system of eye tracking to integration and transformation;
   the network link is configured to enable transmission of audio and video streams and holographic image data between the lecturing classroom and a 5G cloud rendering engine and a holographic terminal of the listening classroom;
   the graphics processing unit is configured to, perform rendering of teaching video streams and holographic images of a classroom terminal; and the classroom terminal comprises the lecturing classroom and the listening classroom;
   the holographic terminal is configured to, by the holographic terminal, realize interactions between a teacher and holographic teaching resources and teaching environment in a teaching process by perceiving various interaction behaviors of the teacher;
   the holographic displayer is configured to, by a holographic display terminal, provide a display platform for the holographic teaching resources and a natural interaction; and
   the cloud server is configured to, by a client and could, provide teaching resources, analysis of teaching behaviors and process and teaching service management for users.

2. The 5G interactive distance dedicated teaching system of claim 1, wherein the holographic displayer is respectively provided in the lecturing classroom and the listening classroom to construct a virtuality-reality fused holographic imaging environment.

3. The 5G interactive distance dedicated teaching system of claim 2, wherein a holographic head mounted display with augmented reality function is provided for the teacher in the lecturing classroom, and is configured to transmit holographic images rendered by the graphics processing unit to the listening classroom through a 5G network; and the listening classroom is equipped with a holographic projector, a holographic light-emitting diode (LED) screen and a holographic film, which are configured for three-dimensional representation of teaching activities in the lecturing classroom through a holographic rendering mode.

4. A method of operating the 5G interactive distance dedicated teaching system of claim 1, comprising:
   (1) collecting data of videos, voice, gesture, body movements, facial expressions, rotations of head and focus of sight lines of the teacher in the lecturing classroom and a holographic interaction image in real time with the help of a recording device, a motion sensor, an expression sensor, a head sensor and a sight sensor according to diversified teaching behaviors of the teacher in teaching-listening and teacher-student interaction activities in the lecturing classroom;
   (1.1) integrating video and audio signals of the lecturing classroom recorded by the recording device into a synchronous recording form through a multi-stream recording mode; storing voice data in a pulse code modulation (PCM) format according to a G.728 audio protocol; compressing HDMI video source codes into a standardized stream media content with a 4K resolution according to a HEVA video protocol; and generating an on-demand list in an MP4 format in the cloud server;
   (1.2) collecting depth images of the teacher using a depth sensing device to obtain skeleton data of the teacher; tracking 25 key skeletal regions of the teacher using an inertia-based motion capture device and recording movements of the teacher in a Biovision Hierarchy (BVH) format; uploading the movements of the teacher to the 5G cloud rendering engine to assist interaction between subsequent data perception and holographic environment;

(1.3) constructing a target tracking system in the lecturing classroom using a camera and a desktop telemetry eye tracker; obtaining head spatial postures of the teacher in real time using a head posture estimation technology; subjecting the head spatial postures of the teacher and a coordinate system of eye tracking to integration and transformation; setting a blink recovery time and a gaze recovery time; recording a duration that a gaze point of the teacher is maintained to quantify visual attention of the teacher to areas of interest; and describing key parameters of head and sight of the teacher in an evs format;

(1.4) building a gradient boosting decision tree using a regression-based face alignment algorithm; obtaining data of facial key points of the teacher in a video sequence and extracting 3D coordinates of feature points of eyes, eyebrows and mouth of the teacher; and describing information of captured facial expressions of the teacher using a string in UTF8MB4 format;

(1.5) performing multi-angle and multi-camera scanning on the lecturing classroom through a wide-angle acquisition technology to fuse teaching video images of the teacher in real time; adjusting a position of the teacher in time according to direction and intensity of a light source in the lecturing classroom to maintain a balanced binocular parallax of the teacher; and performing dynamical collecting and tracking on a teaching process;

(2) transmitting data and cloud rendering contents collected from classroom terminals to a cloud server and a rendering cluster through a 5G/wireless-fidelity (WIFI)/positioning module, a wireless router and a 5G wide-area internet protocol (IP) network link by control, access and forwarding technologies;

(2.1) connecting the lecturing classroom and the listening classroom to 5G network using wireless and wired modes; wherein in the wireless mode, 5G signals are converted into WIFI signals by a centralized cloud-radio access network (C-RAN); and in the wired mode, the 5G signals are converted into the WIFI signals through an access point (AP) using a customer premise equipment (CPE) as an optical transport network (OTN) dedicated line device, and; and optical signals are connected through optical fiber gateways and an optical splitter device;

(2-2) predicting a position of a receiving end of a transmission response target through positioning measurement technologies of WIFI, common frequency band, local area network and an inertial sensor using a high frequency or millimeter-wave communication method and a position estimation-fused hybrid positioning algorithm; and (2.3) connecting cloud, terminal, 5G core network and base station based on combination of central cloud and edge calculation to perform real-time collection and transmission of 4K ultra-high-definition videos and holographic image contents; and partaking more core network traffic and computing abilities by a multi-access edge computing (MEC);

(3) transmitting audio and video streams and holographic image data of the lecturing classroom and the listening classroom to the graphics processing unit through a 5G link for rendering; and transmitting the rendered holographic image to a holographic display terminal of the classroom terminals through cloud-based decoding, situation matching, graphics processing unit (GPU) real-time rendering and cloud-based encoding; wherein the cloud-based decoding and the cloud-based encoding are a pair of opposite processes;

(3.1) receiving, by the graphics processing unit, the audio and video streams and the holographic image transmitted through the 5G network followed by combining other collected interaction data to complete decoding operation;

(3.2) determining the holographic image that needs to be presented in a next frame from a perspective of the teacher through combination of teaching situations and interactions between the teacher and resources; and updating a position, a posture and a scale ratio of a corresponding model in a teaching scene according to teaching situations and interactive operations, so as to determine contents of the next rendered frame;

(3.3) rendering, by the 5G cloud rendering engine, contents of each frame using a GPU computing power to generate a new holographic image and sound; wherein the 5G cloud rendering engine has functions of rendering scheduling, GPU computing power and rendering engine to enable the rendering of the uploaded audio and video streams and the holographic image of the classroom terminals;

(3.4) programming the audio and video streams and the holographic image generated by the graphics processing unit by H.265 video coding;

(3.5) adopting an asynchronous rendering technology to ensure that a media transfer protocol (MTP) between the graphics processing unit and the holographic displayer is less than or equal to 20 ms, thereby enabling a gap between the holographic image on the classroom terminal and the holographic image being rendered by the 5G cloud rendering engine to be not more than 2 frames to ensure visual synchronization between the lecturing classroom and the listening classroom; and in the rendering process of holographic images, adopting a load balancing algorithm based on dynamic prediction of a recursion depth to ensure that each GPU bears a load corresponding to the rendering and drawing performance;

(4) collecting relevant information of the holographic environment of the lecturing classroom; analyzing and sorting out characteristics of the teacher in terms of motions, emotions and behaviors; according to teaching requirements, presetting spatial positioning points in the lecturing classroom and connecting rich media teaching resources; registering the rich media teaching resources with the spatial positioning points in the lecturing classroom to allow the teacher to actively identify and trigger the spatial positioning points; and according to an input type of the interaction, generating various operation commands for interaction with the holographic image to realize the interaction of teachers and students with environment and teaching resources;

(4.1) collecting virtual objects, virtual scenes and related information of the teacher in the holographic imaging environment of the lecturing classroom; and analyzing and sorting out the characteristics of the teacher in terms of motions, emotions and behaviors under the support of a teaching strategy database, a behavior rule database and a domain knowledge database;

(4.1.1) collecting the relevant information of the lecturing classroom; wherein the relevant information of the lecturing classroom comprises addition, deletion, modification and reorganization of teaching objects in the holographic imaging environment, a jump and a jump sequence of the virtual scene and postures, facial expressions, head movements and sight changes and behavior changes of the teacher;

(4.1.2) according to teaching objectives, styles and characteristics, analyzing and sorting out the characteristics of the teacher with the support of the teaching strategy database, the behavior rule database and the domain knowledge database; and classifying characteristic data of different levels of reaction type, compound type and intelligent type according to the motions, emotions and behaviors;

(4.2) constructing a virtual-reality integrated teaching scene; according to the teaching requirements, presetting the spatial positioning points in the lecturing classroom and connecting the rich media teaching resources; registering the rich media teaching resources with the spatial positioning points in the lecturing classroom to allow the teacher to actively identify and trigger the teaching resources associated with the spatial positioning points in the teaching process, thereby enabling the presentation of the holographic image of the teaching resources on the holographic terminal;

(4.2.1) constructing a holographic display environment in the lecturing classroom; and presetting and locating, by the teacher, the teaching resources to a certain position in the lecturing classroom through the spatial positioning points;

(4.2.2) according to teaching requirements of a subject, creating and editing, by the teacher, the rich media teaching resources suitable for display in the holographic imaging environment; registering virtual contents in a real environment and setting trigger conditions to complete the association between the teaching resources and the real spatial positioning points; and recording corresponding storage information in a JavaScript object notation (JSON) format and uploading the recorded information to a cloud;

(4.2.3) triggering, by the teacher, the teaching resources associated with the spatial positioning points according to teaching needs during teaching, question-answering and interactive activities in the lecturing classroom;

(4.3) according to the input type of the interaction of the teacher, invoking behavior rules to generate various operation commands for interaction with the teaching resources; and jumping and switching, by the teacher, an interface, a scene and a model of a holographic teaching environment to realize the interaction with the environment and the teaching resources;

(4.3.1) according to the input type of the interaction of the teacher, invoking execution rules corresponding to input characteristics of voice, gesture, body, sight and head to generate the operation commands comprising push, pull, shake, shift and drag for interaction with the holographic teaching resource images associated with the spatial positioning points;

(4.3.2) according to interactive commands of gestures and postures, selecting, rotating, zooming, moving, showing/hiding and playing, by the teacher, holographic teaching contents associated with the spatial positioning points to perform jumping and switching of the interface, the scene and the model of the holographic teaching environment, so as to realize the interaction with the environment and the teaching resources;

(5) according the teaching needs, creating interactive and personalized virtual teaching scenes, and outputting the virtual teaching scenes as holographic resources using a Unity engine and a holographic rendering development kit; building a virtual-reality integrated holographic imaging environment by providing different holographic display terminals in the lecturing classroom and the listening classroom; and guiding the teacher to pay attention to and trigger the spatial positioning points in the teaching environment through a visual cue, a tactile feedback, voice or sound effect to achieve multi-modal interactions;

(5.1) according to the teaching needs, modifying display attributes, audio effects and playing sequence of a 3D model in the teaching scene to complete editing of the personalized and interactive virtual teaching scenes; and outputting the virtual teaching scenes as the holographic resources using the Unity engine and the holographic rendering development kit;

(5.1.1) building a complete virtual teaching resource library to enable the teacher to quickly find and select the required virtual teaching resources; and according to the teaching needs, editing the personalized and interactive virtual teaching scenes by modifying geometry, texture and material properties of the 3D model in the teaching scene, adding sounds and audio effects, specifying a rendering mode of the virtual scene and setting the playing sequence of the virtual scenes;

(5.1.2) outputting the virtual teaching scenes as the holographic resources using the Unity engine and the holographic rendering development kit to achieve the construction of the holographic teaching resources; and associating the holographic teaching resources with the spatial positioning points to stimulate, invoke and watch the holographic teaching resource images according to the teaching needs;

(5.2) providing a holographic head mounted display with augmented reality function for the teacher in the lecturing classroom; providing a holographic projector, a holographic LED screen and a holographic film in the listening classroom; and constructing the holographic teaching environment formed through superposition of the virtual teaching resources and a real space of the lecturing classroom using the holographic display terminal;

(5.2.1) constructing the holographic teaching environment formed through superposition of the holographic teaching resources and the real space and an information interaction loop between the teacher, the teaching resources and the real environment using the holographic display terminal; and setting a first perspective to enable the teachers and students in the listening classroom to obtain the same visual experience as the teacher in the teaching room;

(5.3) guiding the lecturer to pay attention to and trigger the spatial positioning points in the teaching environment through the visual cue, the tactile feedback, the voice or the sound effect; and dragging, rotating and zooming objects in the holographic imaging environment by using gestures, sight and voice;

(5.3.1) guiding the lecturer to pay attention to and trigger the spatial positioning points in the teaching environment through the visual cue, the tactile feedback, the voice or the sound effect using a holographic imaging system, so as to present videos of the associated holographic teaching resources, wherein the holographic imaging system is capable of making full use of space environment of the classrooms; and allowing the lecturer to interact with the teaching resources according to the teaching process;

(5.3.2) capturing a position and movement information of the lecturer in a holographic teaching space through a built-in sensor and a positioning tracker of the holographic head mounted display; and allowing the lecturer to view details of the virtual objects in the teaching resources from multiple perspectives and drag, rotate and zoom the virtual objects in the holographic environment by using the gestures, sight and voice;

(6) publishing a teaching resource application; analyzing teaching behaviors and processes; and performing teaching service management; wherein the publishing of a teaching resource application comprises publishing and push of the teaching resources and update of the spatial positioning points;

(6.1) publishing the teaching resources adapted to multiple terminals according to configuration information collected in the classroom terminals; and pushing an update data package to a client through a message push and hot update mechanism; recording information of the spatial positioning points and updating the information of the spatial positioning points to the cloud;

(6.1.1) providing download permissions for different teaching resources according to a teacher's permissions; providing content matching of different resolutions according to an operating system and screen size and resolution of the lecturing classroom terminal and the listening classroom terminal; and completing a multi-terminal adaptation of resources according to absolute coordinates of the spatial positioning points to ensure that the resources at the spatial positioning points do not shift during interaction;

(6.1.2) according to the information of the classroom terminal recorded in the background, sending, by the cloud server, upgrade and update information to the classroom terminal through the message push mechanism; and pushing course contents, teaching resources and virtual scenes updated in the cloud to the classroom terminal in a form of data packet through the hot update mechanism;

(6.1.3) recording the information of the spatial positioning points set and edited by the lecturer in course resources in the JSON format, wherein the information of the spatial positioning points comprises ID, three-dimensional positions and elements, statuses, positions, postures and zoom ratios of holographic teaching scenes; and synchronously storing the information of the spatial positioning points to the cloud to meet sharing experience of the same spatial location on different terminals in a dedicated classroom system;

(6.2) analyzing a teaching style of the lecturer by counting the teaching situations of teachers and students before, during and after class; analyzing the degree of focus of the students in the listening classroom by counting learning behaviors of the students, comprising head up and down and visual residence time to obtain evaluation data of teaching emotions, behaviors and effects;

(6.2.1) recording a lesson preparation situation of the teachers and a preview situation of the students in real time before class according to the remote and holographic teaching environment where teachers and students of the system are located; checking an operation process of the teachers and students in real time in class, and analyzing completion situation of homework and data on the strong and weak points of knowledge mastery after class; and analyzing the teaching style of the lecturer based on a T-S model;

(6.2.2) analyzing the degree of focus of the students in the listening classroom by counting learning behaviors of the students, comprising head up and down and visual residence time, to obtain the evaluation data of the teaching emotions, behaviors and effects; and performing an accurate portrait description on each student according to grades and completion progresses of the homework;

(6.2.3) monitoring and measuring teaching activities in real time; completing synchronization configuration, load balancing configuration and resource monitoring of service nodes; monitoring and judging status of each node and intelligently selecting an optimal node according to an IP address of each of the classroom terminals;

(6.3) managing the teaching service system, wherein the management of the teaching service system comprises management of teacher permissions, teaching resources and teaching activities, system setting, system maintenance, parameter setting and data backup and recovery;

(6.3.1) providing login, verification, timing, resource editing, and classroom creation functions for the teachers when using the cloud server to assist the teachers to log in to the cloud server, pass identity verification, record use time and retrieve virtual teaching resources based on permissions and create or log in to dedicated classrooms;

(6.3.2) managing the virtual teaching resources and recorded teaching resources thereof using a catalog-style scene tree according to a level of section>discipline>unit>knowledge point, wherein each node corresponds to a teaching resource; and (6.3.3) performing flexibly various forms of teaching activities in the dedicated classroom system, wherein the dedicated classroom system supports the synchronous online teaching between one lecturing classroom and multiple listening classrooms, or supports the synchronous online teaching between multiple lecturing classrooms and multiple listening classrooms.

\* \* \* \* \*

UNITED STATES PATENT AND TRADEMARK OFFICE
CERTIFICATE OF CORRECTION

| | | |
|---|---|---|
| PATENT NO. | : 11,151,890 B2 | Page 1 of 1 |
| APPLICATION NO. | : 17/225088 | |
| DATED | : October 19, 2021 | |
| INVENTOR(S) | : Zongkai Yang et al. | |

It is certified that error appears in the above-identified patent and that said Letters Patent is hereby corrected as shown below:

On the Title Page

Item (73), should read:
Central China Normal University Hubei, CN

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*